J. B. GETZ.
GEARING FOR WASHING MACHINES.
APPLICATION FILED JAN. 15, 1915.

1,254,133.

Patented Jan. 22, 1918.
5 SHEETS—SHEET 1.

UNITED STATES PATENT OFFICE.

JOHN B. GETZ, OF MORTON, ILLINOIS, ASSIGNOR TO GETZ POWER WASHER CO., OF MORTON, ILLINOIS, A CORPORATION OF ILLINOIS.

GEARING FOR WASHING-MACHINES.

1,254,133.  Specification of Letters Patent.  Patented Jan. 22, 1918.

Application filed January 15, 1915. Serial No. 2,349.

*To all whom it may concern:*

Be it known that I, JOHN B. GETZ, citizen of the United States, a resident of Morton, in the county of Tazewell and State of Illinois, have invented new and useful Improvements in Gearing for Washing-Machines, of which the following is a specification.

This invention has reference to washing machines and particularly that type used for domestic purposes in the household.

The invention relates primarily to the mechanism for transmitting an alternative rotary movement to the dolly or agitating shaft of the washing machine, from an electric motor or other suitable source of power; also to the mechanism for transmitting movement from said electric motor or other source of power to the rolls of the wringer, including means for reversing said wringer rolls at the will of the operator.

The mechanism for transmitting an alternative rotary movement to the dolly shaft of the washing machine or machines, includes a pair of ordinary bevel gears at the head of the dolly shaft, adapted to receive motion from a segmental gear in mesh with a pinion carried by a transverse shaft on the cover of the washing machine or machines on the inner end of which is carried one of the bevel gears for operating said dolly shaft. The dolly, its shaft, the bevel gears, transverse shaft referred to and pinion, are carried by the cover of the machine, and when said cover is raised, these parts are removed to an inoperative position, disconnecting the pinion from the segmental gear.

The invention has for a further object, to arrange washing machines in multiple, and to operate the dolly shafts of said machines from a common driving means and to support a wringer to be used in connection with either one of said machines.

The invention has for a further object, to provide a support for one or more washing machines and a wringer to be used with either one of said machines, and an extensible support or frame on which one or more rinse tubs may rest during the washing operation, to receive the clothes from either one of said machines, between said wringer rolls.

To the accomplishment of the foregoing and such other objects as may hereinafter appear, my invention consists in the combination, construction and arrangement of parts hereinafter described, and then sought to be defined in the appended claims, reference being had to the accompanying drawings forming a part hereof, and which show merely for the purpose of illustrative disclosure, a preferred embodiment of my invention, it being understood that various changes may be made in practice within the scope of the claims, without digressing from my inventive idea.

Fig. 3 is a plan view with the washing machines and wringer support and wringer removed and with the platform partly broken away to show the gearing for transmitting motion to the dolly shaft of the washing machine or machines and to the wringer;

Like characters of reference designate corresponding parts throughout the figures.

This invention has reference to that type of household laundry machines, wherein a washing machine and a wringer are combined, the wringer being movable with respect to the washing machine so that after the first washing operation, the clothes may be wrung direct from the washing machine into a rinse tub, and the wringer moved to an adjusted position so that the clothes may be run direct from the rinse tub into a basket or other receptacle. The wringer is driven by mechanism, which is not disturbed by the movement of said wringer to adjusted positions, and includes means for reversing the wringer rolls so that the rolls may be driven in either direction to facilitate the washing operation or to take care of knots which may tend to clog the wringer rolls during the passage of clothes therebetween.

The arrangement of the parts and devices embodying my invention, is such that I may employ only one washing machine and one wringer or the same may be connected in multiple, so that I can use two washing machines and one wringer, as shown in the drawings. That is to say, if the machine is of the platform type, the main support will carry one washing machine and be capable of supporting one rinse tub, the extensible support or frame adapted to form a rest for an additional rinse tub or tubs or other receptacles and the wringer positioned somewhat as shown, and capable of being swung so as to be caused to register with a washing machine or either one of said rinse tubs or other receptacles. This same arrangement may be used in connection with what is known as a stave leg machine, but I prefer the platform type. If the machines are connected in multiple, the main support will form a rest for two washing machines, as shown in the drawings, and the mechanism of the two machines for driving the dolly shafts thereof, will be driven from a common driving means, and the wringer movably supported so that it may be caused to register with either of said washing machines and one or more rinse tubs or other receptacles resting upon the extensible support or frame used for that purpose.

Ordinarily one washing machine and one wringer, together with means for supporting one or more rinse tubs or receptacles, is sufficient for household use, but there is a demand for washing machines connected in multiple, so that the clothes may go through the process of two washing operations in the same machine. That is to say, one of said washing machines is used for the first cleansing operation, the wringer swung to a position to register between the two machines and the clothes passed between the wringer rolls from the first washing machine to the second, where the same is subjected to a second washing operation. After the second operation, the wringer is swung to a position between the second washing machine and one of the rinse tubs and the clothes passed between the wringer rolls from the second washing machine into the rinse water tub, after which, the wringer may again be moved to a third position, whereby the clothes may be passed from the rinse water tub into a second rinse water tub or other receptacle or basket; it being understood that both washing machines may be operated simultaneously, or that during the operation of one, clothes may be wrung from the other, and during the operation of one or both machines, the wringer may be in use rinsing clothes from one tub to another. To disconnect either one of the washing machines from the power driving means, the lid of the machine is raised, which elevates the immediate driving means for the dolly shaft away from the driving connections with the power.

The main frame of the machine comprises the angle iron bars 1, which are bent so as to provide the side rails 2 and the corner legs 3. The legs 3 at each corner are connected by the transverse angle iron brace bars 4, and angle iron braces 5 which extend longitudinally of the frame and connected at their opposite ends to the transverse angle iron brace bars 4. The rails 2 of the angle iron bars 1, support the platform 6. This platform is preferably made of wood, extends across between the two rails 3 and secured thereto and extends approximately the full length of said rails. At 7 the platform 6 is cut away to admit a connecting bar, which connects the segmental gears, to be described, with the operating means for transmitting movement to the dolly shaft of the washing machine or machines.

Secured to the underside of the rails at suitable points, are angular brackets 8. To these brackets are secured the opposite ends of transversely disposed channel bars 9, said channel bars not only serving as additional transverse brace bars of the main frame, but also serving as guiding means for the end bars 10 forming a part of a supplemental extensible support which includes not only the end bars 10, but additional bars 11 arranged parallel with the bars 10 and spaced therefrom, said intermediate bars 11 being connected at their opposite ends to longitudinal brace bars 12 and 13, which are also connected to the end bars 10 of said supplemental extensible frame. The end bars 10 of this frame are bent to form the supporting legs 14, and said legs are braced by the longitudinal brace bar 15. The supplemental extensible supporting frame may be moved out and in from beneath the main supporting frame by the operator grasping the longitudinal brace bar 12 and pulling the frame outwardly and pushing it inwardly, the end bars 10 moving in and being guided by the channels in the channel bars 9, as will be understood.

Resting upon and secured to the platform 6 of the main support, are the washing machines 16 and 17. These washing machines do not differ materially from washing machines now in use, except in the specific mechanism for operating the dolly shafts thereof, which forms a part of the present invention. Said machines are provided with covers or lids 18, hinged at 19. The arrangement of the hinges for the lids or covers of the machines may be located at convenient points to facilitate the raising and lowering of said lids or covers, whereby the operator may remove from said machines, the clothes to be passed between the wringer rolls of the wringer. Extending through the lid or cover of each machine is a dolly shaft 20 on the lower end of which is carried a suitable dolly or agitator, not shown, which may be of any suitable or desired construction.

Secured to the lid or cover 18 of each machine, is a bracket 21. Each bracket is formed with a tubular bearing 22 extending down into the lid or cover of the machine, and with a cup 23 in which is carried a bevel gear wheel 24 having a sleeve extension 25 journaled in the bearing 22 of the bracket 21. Each gear 24 and its sleeve 25 is provided with an opening which is preferably square in cross section, through which the dolly shaft extends, which is of corresponding shape in cross section, so that any motion which is transmitted to the gears 24, will be in turn transmitted to said dolly shaft 20. The brackets 21 are formed with angular bearing extensions 26 and 27, in which are journaled short shafts 28. On the inner end of each short shaft 28, is carried a bevel gear 29 which meshes with the bevel gear 24 carried on the dolly shaft 20, and on the outer end of each shaft 28, is carried a spur gear 30, for receiving and transmitting movement from a driving connection to said shaft 28 and through said shaft 28 and the gears 29 and 24, to the dolly shaft 20. There is provided for the gears 29 and 24, a suitable cap or cover 31, each of said caps or covers being secured to the brackets 21, through corresponding ears and bolts provided for this purpose. Each cap or cover 31 has a centrally disposed depending sleeve 32 forming a bearing for the sleeve 33. The lower ends of these sleeves 33 are located in juxtaposition to, or immediately above, the upper faces of the gears 24, and serve as a spacing means for holding the gears 24 in operative relation with the gears 29 and prevent the same from lifting during operation. The sleeves 33 are provided with squared openings therethrough, to receive the corresponding shaped dolly shafts 20, and on the outer ends of said shafts 20 are provided buttons 34 to secure said shafts in operative relation to the other parts of the driving mechanism. The brackets 21 may be secured to the lids or covers of the machines by the bolts 35 passing through ears 36 of the brackets and into the lids or covers of the machines.

To the outside of each of the washing machines 16 and 17 and at suitable points, are secured brackets 37. The brackets each have a stud or trunnion 38 on which is journaled a segmental gear 39, each segmental gear 39 meshing with a spur gear 30 on a shaft 28, journaled on the lid of each of the washing machines.

Figure 1:
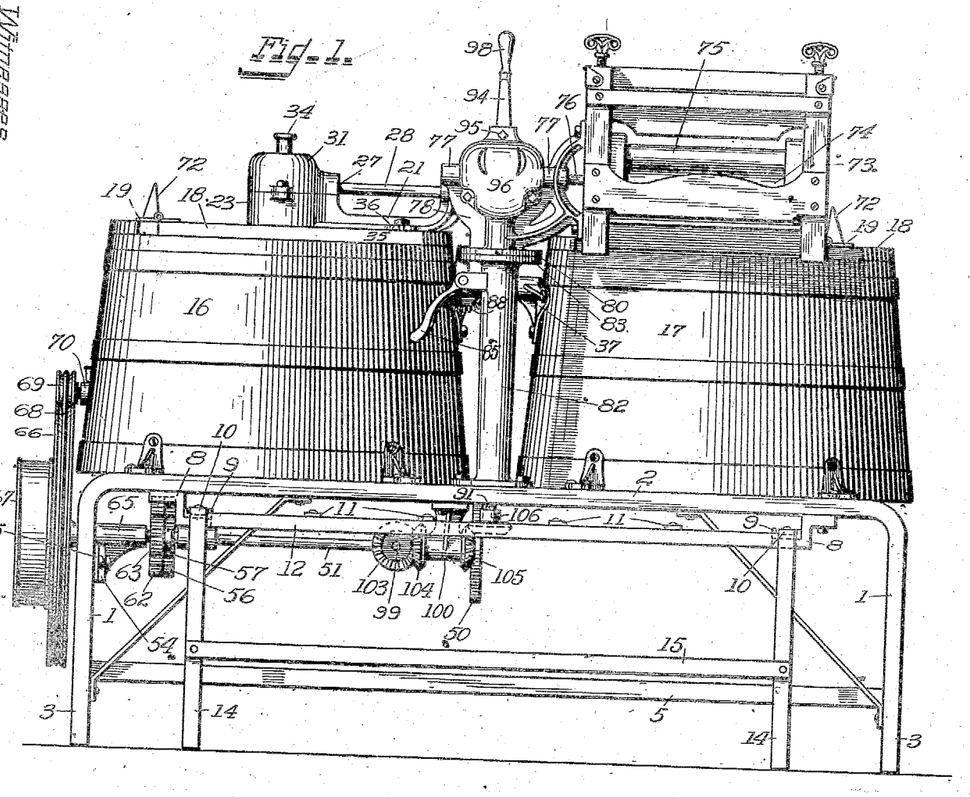
Figure 1 is a side elevation of my improved machine, the wringer being swung to a position adjacent one of the washing machines.
Figure 2:
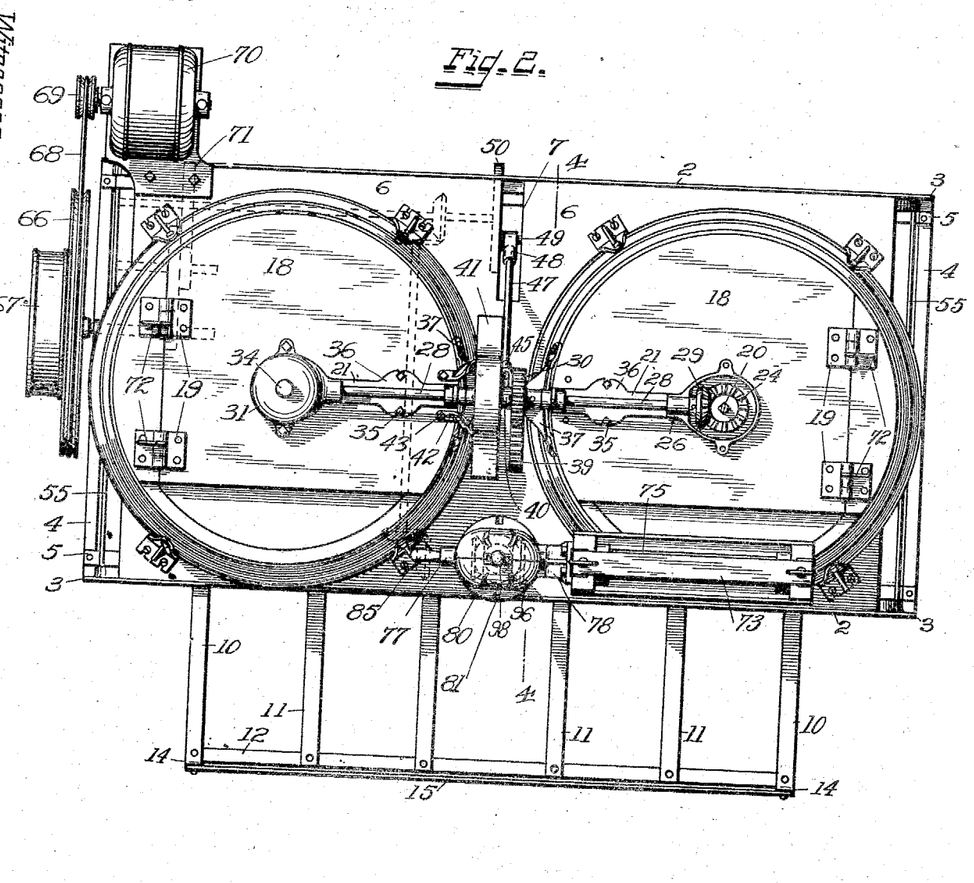
Fig. 2 is a plan view with the rinse tub support or rest extending part way from beneath the main support and with parts removed to show certain of the gearing for transmitting movement to the dolly shaft of one of the machines.
Figure 4:
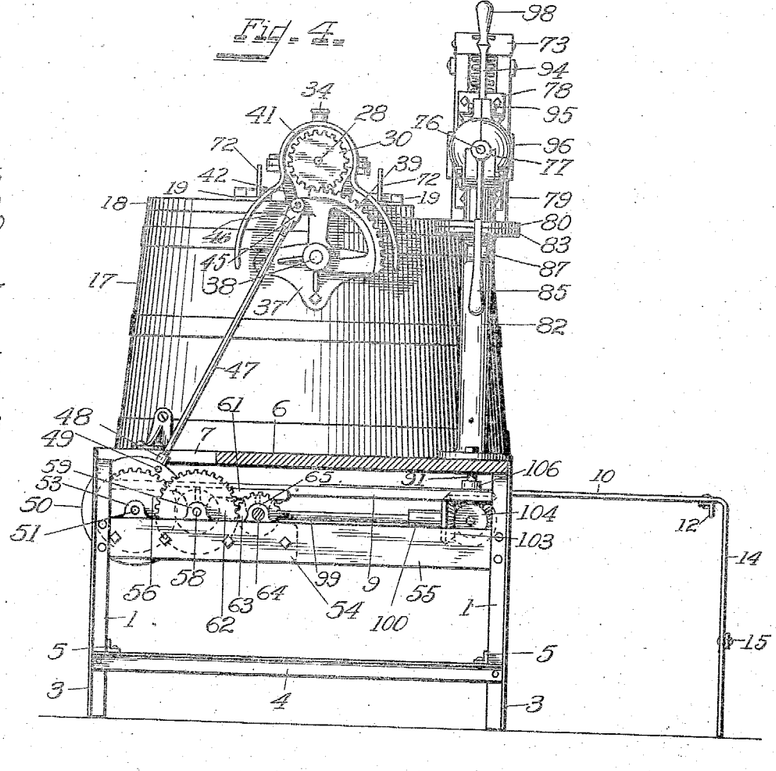
Fig. 4 is an elevation in section as the same would appear if taken on the line 4—4 of Fig. 2.
Figure 5:
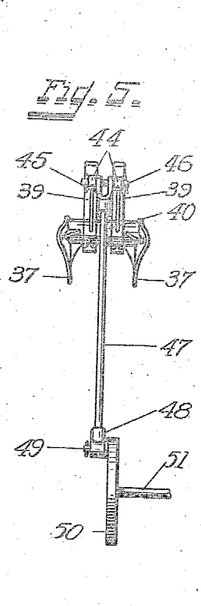
Fig. 5 is a detail in elevation, showing the driving connections for the segmental gears.
Figure 6:
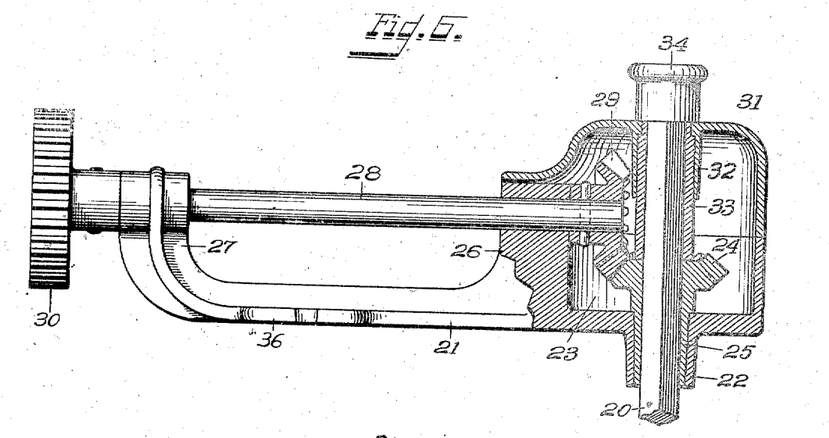
Fig. 6 is an enlarged elevation in section, showing the immediate gearing for operating the dolly shaft of the washing machine or machines.
Figure 7:
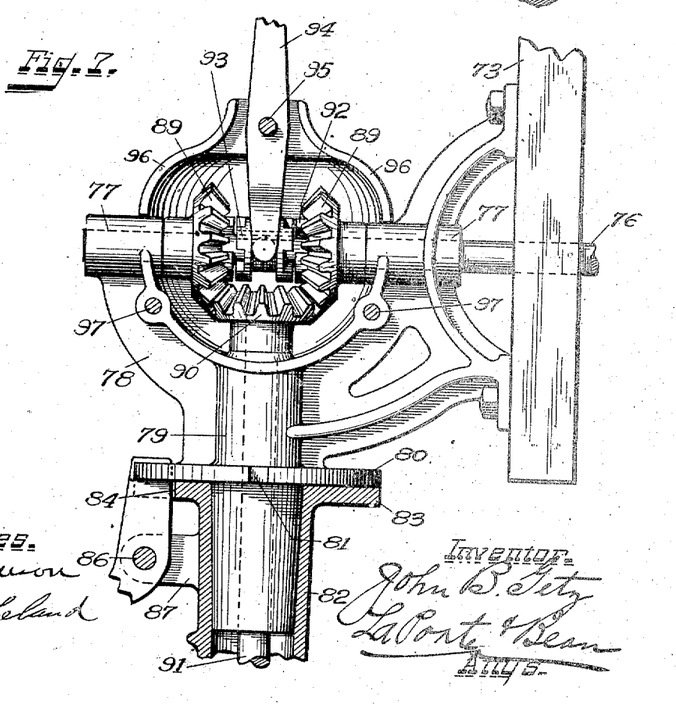
Fig. 7 is an enlarged elevation partly in section, showing the reversing gearing for transmitting motion to the wringer rolls of the wringer, and of the locking means for holding the wringer in adjusted positions.

As shown, the shafts 28 carried by the lids or covers of the washing machines, when said lids or covers are closed, are in axial alinement, extending longitudinally of the main support with the gears 30 on the ends of said shafts spaced a short distance from each other, as shown in Fig. 2; therefore, the studs or trunnions 38 of the brackets 37 secured to the washing machines, must also be in axial alinement. These studs or trunnions 38 after passing through the segmental gears 39, terminate in a spacing collar 40, see Figs. 2 and 5, which said collar 40, maintains the segmental gears 39 in proper spaced relation. The gears 30 and segmental gears 39 are suitably protected by the shields or guards 41, being of suitable contour to cover the said gears 30 and segmental gears 39, and being attached to the lids or covers of the washing machines through the bracket arms 42 and bolts 43.

Each segmental gear 39 is provided with an ear 44 and to said ears is connected a yoke 45 by means of a pin 46, the arms of the yoke being located between the ears 44 of said segmental gears and said yoke 45 is provided with an extension 46 to which is connected the upper end of a pitman bar or rod 47, the lower end of said bar or rod 47 connected with a coupling 48 having a bearing to receive a pin 49 projecting laterally from a disk 50 carried on the inner end of a longitudinally disposed shaft 51. The inner end of the shaft 51 is journaled in a bracket 52, suitably secured beneath the main frame of the machine and the outer end of said shaft 51 is journaled in a bearing 53 forming a part of a bracket 54 secured to a transversely disposed support 55 connected at its opposite ends to the legs at one end of the supporting frame. On the shaft 51 at or near its outer end, is carried a spur gear 56 and this gear is in constant mesh with the pinion 57 carried on a short shaft 58 journaled at its forward end in a bearing 59 forming a part of the bracket 54, and the inner end of said short shaft 59 is journaled in a bearing 60, forming a part of a bracket 61, secured to the underside of the channel bar 9, located at this end of the machine. Also carried by the short shaft 58, is a spur gear 62 which is similar to the gear 56, and said gear 62 is in constant mesh with the pinion 63, similar to the pinion 57, said pinion 63 carried on what is known as the driving shaft 64. This driving shaft is journaled in a bearing 65 forming a part of the bracket 54 and also a bearing 66 forming a part of the bracket 61. On the outer end of the driving shaft 64 are carried the pulley wheels 66 and 67, the former adapted to be driven by a belt 68, driven from a small pulley wheel 69, connected with an electric motor 70, this motor being supported on a bracket 71 secured to the main frame of the machine. The pulley 67 may be used for receiving power through a belt from a gasolene engine or other similar source of power, in the event it is not desirable to operate the mechanism of the washing machine or washing machines and wringer from an electric motor, as shown.

I will now describe the transmission of power from the electric motor 70 or other source of power through the mechanism described, to the dolly shaft or shafts of the two washing machines, assuming that the lids or covers 18 of the machines are closed with the gears 30 in mesh with the segmental gears 39. Power being transmitted to the driving shaft 64, either through the pulley 66 or the pulley 67, and said shaft being rotated, the pinion 63 will drive the gear wheel 62, the gear 62 being on the same shaft with the pinion 57, the latter will in turn drive the gear 56 on the longitudinally disposed shaft 51, and it being rotated, will impart a reciprocating motion to the pitman bar or rod 47, and with each complete stroke of said bar, the segmental gears 39 to which it is connected, will be oscillated, first in one direction and then back, and such movement will impart an alternative rotary movement to the shafts 28 through the gears 30 carried thereon, which said gears, as shown, are in mesh with the segmental gears 39. This alternative rotary movement, which is imparted to the shafts 28, will in turn be imparted to the dolly shafts 20 of the washing machines through and by means of the bevel gears 29, carried on the inner ends of the shafts 28, which are in mesh with the gears 24 carried by said dolly shafts. To disconnect either one of the dolly shafts 20 from their source of power, assuming that the train of gearing just described, connected to the driving shaft is in motion, all that is necessary to do is to raise the lid or cover of either of the washing machines which will separate the gears 30 from their segmental gears 39 and thus stop the operation of the dolly shafts which have been raised out of the machine or machines, enabling the operator to take from, or put clothes into, said machine or machines. When the lids or covers are thrown back into open position, they will rest against the plates or rests 72, suitably connected with the hinges 19, as shown.

From the foregoing description, it is obvious that the dolly shafts on both machines may be operated simultaneously, disconnected from their source of power at the same time or one or the other driven separately and independently of each other, if desired.

I will now describe the wringer and the manner of adjusting the same relatively to the washing machine or machines, and the means of driving the same from the driving shaft and the reversing means thereof.

The wringer is of the usual and ordinary construction, comprising as it does, a suitable frame support referred to generally as 73. On this frame is rotatably mounted the wringer rolls 74 and 75. These rolls are suitably geared together so that they may be rotated toward each other at all times, the gearing being of usual and ordinary construction but not shown. The wringer roll 74 has an extension shaft 76, and the outer end of this shaft is journaled in spaced bearings 77 forming a part of a bracket 78, which is secured to and which supports the wringer frame 73 and rolls 74 and 75. The bracket 78 is provided with a vertically disposed tubular bearing member 79, divided by an annular plate or flange 80, said plate 80 having a series of radially disposed slots 81. The lower portion of the vertically disposed tubular bearing 79 of the brackets 78, is rotatably carried and has a bearing in the upper end of a tubular support or standard 82, which said standard is mounted upon and secured to the main frame or platform of the machine, as will be seen in the figures, at a point to one side of the main frame, and intermediate the two washing machines, so that the wringer may be swung from one machine to the other with the wringer rolls extending longitudinally of the main frame or at right angles thereto, as may be desired, to cause the same to register with one or more rinse tubs adapted to rest or be supported on the supplemental extensible frame of the machine. The upper end of the tubular support or standard 82 is provided with an annular plate or flange 83, corresponding to the annular plate or flange 80 of the bracket 78, and on which said annular plate or flange 80 rests and is rotatably mounted. The annular plate or flange 83 has only one radial slot 84, whereas the annular flange or plate 80, as described, has a plurality of radial slots 81, and means is provided which will enter any one of the radial slots 81 in the flange or plate 80 when the same are brought coincident with the radial slot 84 of the plate or flange 83 after the wringer has been swung to an adjusted position, for locking and holding the same in such position.

This locking means comprises a lever 84 fulcrumed at 86 between ears 87 extending laterally from the tubular support or standard 82 at or near the upper end thereof. The locking end of said lever when disengaged from the slot 84, in the plate or flange 83, will ride on the peripheral face of the plate or flange 80 and be caused to yieldingly bear against said peripheral face by means of the spring 88 bearing between the outside face of the tubular support or standard 82 and the free end of the lever 85, and when the wringer is swung around and a slot 81 in the flange or plate 80 is brought coincident with the locking end of the lever 85, said lever because of the pressure of said spring 88, will cause the locking end thereof to enter into the coinciding slots of the plates or flanges 80 and 83 and lock the wringer in its adjusted position. To swing the wringer around, the operator will engage the free end of the lever 85 and move it toward the tubular support or standard 85 to release the locking end thereof from the slots in the plates or flanges 80 and 83, when the wringer may be swung to an adjusted position and locked in the manner described.

On the shaft 76 of the wringer roll 74, and between the bearing members 77 of the bracket 78, are carried bevel gear wheels 89 in mesh with the corresponding bevel gear wheel 90 on the upper end of a shaft 91, which extends up through the frame of the machine, the tubular support or standard 82, and the bearing 79 of the bracket 78, so that when the shaft 91 is operated, it in turn will transmit movement to the bevel gear 90 at the upper end thereof and the two bevel gears 89 which are loosely carried on the shaft 76 of the wringer roll 74. The two gears 89 have clutch faces 92 and feathered on the shaft 76 between the two gears is a clutch sleeve 93 with suitable clutch faces on either side thereof, adapted to be thrown into clutch engagement with the clutch faces 92 of either of the gears 89, whereby the shaft 76 carrying the wringer roll 74, may be driven in reverse directions through the operation of the shaft 91, passing through the tubular support or bearing 82. To throw the clutch sleeve 93, a lever 94 is provided, having suitable engagement with the clutch sleeve 93 and being fulcrumed at 95 between the upper matching faces of cap sections 96, which are secured to each other and to the brackets 78, by means of bolts 97 and also by means of the bolt forming the pivot 95 on which the lever 94 is fulcrumed. The lever 94 has a handhold 98 to be grasped by the operator when throwing the lever to place the clutch sleeve 93 in a neutral or inoperative position, or to move said clutch sleeve into engagement with the clutch faces of either of the above gears 89.

The shaft 91 for transmitting motion to the wringer rolls 74 and 75 through the reverse gearing described, is operated from and through the train of gearing connected with the driving shaft 64. This is accomplished through a transversely disposed shaft 99, journaled at one end in the bearing formed on or attached to the bracket 52 previously referred to, and the opposite end of said shaft is journaled in a bearing formed on or attached to a bracket 100 suitably secured to the frame of the machine. On that end of the shaft 99 which receives its power to be transmitted to the shaft 91, is carried a bevel gear 101 meshing with the bevel gear 102 on the shaft 51. On the opposite end of the shaft 99, is carried a bevel gear 103 meshing with the bevel gear 104 carried on a short shaft journaled in a bearing formed on or attached to the bracket 100 and on the other end of said short shaft, is a bevel gear 105 meshing with a bevel gear 106 on the lower end of the shaft 91.

It is obvious therefore, that when the driving shaft 64 is being driven from a suitable source of power such as an electric motor or gasolene engine, the train of gearing connected therewith will transmit motion not only to the longitudinally disposed shaft 51, but will through said shaft 51 and the transverse shaft 99, impart motion to the upright shaft 91 which drives the wringer.

What I claim is:—

1. In a machine of the character described, a machine, said machine having a hinged cover or lid, a bracket secured on the outside of said lid or cover and at its inner end formed with a cup and a depending sleeve having a bearing in the lid or cover, and adjacent said cup on the outside formed with an angular bearing portion, said bracket at its outer end being formed with an additional angular bearing portion, a gear wheel having a hub journaled in the sleeve depending from said bracket, an operating shaft passing up through the gear and its extended hub, a short shaft journaled in the angular bearing portion of said bracket, a gear wheel on the inner end of said short shaft in mesh with said first mentioned gear wheel, means for operating said short shaft, a cap adapted to be secured to the bracket and in conjunction with the cup of the bracket to form a closure for said gear wheels, said cap having a depending tubular portion, an elongated collar or sleeve extending up from the first mentioned gear and having a bearing in the depending sleeve of the cap, said collar or sleeve forming a bearing for the upper end of the operating shaft which passes therethrough, and a button on the outer end of said operating shaft.

2. In a machine of the character described, a machine, said machine having a hinged cover or lid, a bracket secured on the outside of said lid or cover and at its inner end formed with a cup and a depending sleeve having a bearing in the lid or cover and said bracket adjacent said cup formed with an angular bearing portion, said bracket at its outer end being formed with an additional angular bearing portion, a gear wheel having a hub journaled in the depending sleeve of the bracket, an operating shaft passing up through the gear and its hub, a short shaft journaled in the angular bearing portion of said bracket, a gear wheel on the inner end of said short shaft in mesh with said first mentioned gear wheel, a gear wheel on the outer end of said short shaft, actuating means on the machine for operating said short shaft through its gear on the outer end thereof, when the lid or cover of the machine is closed, a driving means for said actuating means, a cap adapted in conjunction with the cup of a bracket to form a closure for the gear wheels between the operating shaft and said short shaft, and a spacing means depending from the cap for holding the gear on the operating shaft in proper relation with the gear on the short shaft.

3. In a machine of the character described, a support, a pair of machines mounted on said support, each machine having a hinged cover or lid, an operating shaft for each machine, said shafts passing through and having a bearing in said lids or covers, a short shaft for each machine, said shafts journaled on said covers or lids, driving connections between said short shafts and said operating shafts, a segmental gear for each machine, said segmental gears adapted to drive the short shafts of said machines when said hinged covers or lids are closed, a driving mechanism, and a common driving connection between said segmental gears and said driving mechanism.

4. In a machine of the character described, a support, a pair of machines mounted on said support, each machine having a hinged cover or lid, an operating shaft for each machine, said shafts passing through and having a bearing in said lids or covers, a short shaft for each machine, said shafts journaled on said covers or lids, driving connections between said short shafts and said operating shafts, a segmental gear for each machine, said segmental gears adapted to drive the short shafts of said machines when said hinged covers or lids are closed, a driving shaft, an auxiliary shaft, driving connections between said driving shaft and said auxiliary shaft, and a pitman bar connected with said auxiliary shaft and with both of said segmental gears, whereby said segmental gears may be operated in unison.

5. In a machine of the character described, a platform support, a machine mounted on said platform and having a hinged cover or lid, an operating shaft passing through said lid or cover, a bevel gear carried by said operating shaft at or near its outer end, a short shaft journaled on the outside of said lid or cover, a bevel gear on the inner end of said short shaft in mesh with the bevel gear on the operating shaft, a gear wheel on the outer end of said short shaft, a segment gear wheel journaled on the outside of said machine and adapted to operate the gear wheel on the short shaft when the lid or cover of the machine is closed, a driving shaft journaled on said platform support, an auxiliary shaft also journaled on said platform support, a disk on one end of said auxiliary shaft, a pitman bar connection between said disk and said segment gear, and a train of reduction gears between said driving and auxiliary shafts.

JOHN B. GETZ.

Witnesses:
F. W. REULING,
G. E. WILD.